United States Patent [19]

Axling

[11] Patent Number: 5,406,595
[45] Date of Patent: Apr. 11, 1995

[54] DEVICE FOR SEALING A LEAD-THROUGH

[75] Inventor: Lars Axling, Enköping, Sweden

[73] Assignee: ABB Atom AB, Västerås, Sweden

[21] Appl. No.: 118,189

[22] Filed: Sep. 9, 1993

[30] Foreign Application Priority Data

Sep. 15, 1992 [SE] Sweden .................................. 9202650

[51] Int. Cl.$^6$ ..................... G21C 13/028; G21C 19/20
[52] U.S. Cl. .................................... 376/203; 376/316;
134/166 C; 134/167 C; 137/240
[58] Field of Search ............... 376/203, 204, 254, 310,
376/316; 134/166 C, 167 C, 168 C, 169 C;
137/240

[56] References Cited

U.S. PATENT DOCUMENTS

| | | | |
|---|---|---|---|
| 4,243,484 | 1/1981 | Tsuji et al. | 376/203 |
| 4,534,932 | 8/1985 | Yoshikawa et al. | 376/316 |
| 4,790,976 | 12/1988 | Zahn et al. | 376/316 |
| 4,867,941 | 9/1989 | Le Dantec | 376/316 |

Primary Examiner—Daniel D. Wasil
Attorney, Agent, or Firm—Watson, Cole, Grindle & Watson

[57] ABSTRACT

A device for closing and sealing a lead-through (1), comprising means intended to open, clean and again close the lead-through. A cone (2) with a head (21), a rod-shaped part (22) and a sealing surface (23) arranged between said head and said rod-shaped part is arranged with the head inserted into the lead-through. In the end of the cone opposite to the head, the cone is provided with means (24) for connecting the cone to a flush pipe (5) arranged in the form of an extension of the rod-shaped part of the cone. An annular flange (3) is attached to the lead-through and around said rod-shaped cone, inserted into the lead-through, to retain the head of the cone in the lead-through. A sealing surface (31), arranged on the annular flange in the form of a seat, is adapted to correspond to and make contact with the sealing surface of the cone to close and seal the lead-through.

3 Claims, 1 Drawing Sheet

DEVICE FOR SEALING A LEAD-THROUGH

TECHNICAL FIELD

The invention relates to a device intended for closing and sealing a lead-through, wherein the sealing permits the lead-through to be opened, washed clean and closed again. Preferably, the invention relates to sealing of a lead-through in the form of a so-called neutron detector housing which is arranged in a reactor vessel for a nuclear power plant.

BACKGROUND ART

The vessel of a reactor in a nuclear power plant is provided with a number of lead-through which, where necessary, are prepared for mounting of various sensors or equipment. A number of such lead-throughs are mostly not utilized and then usually closed and sealed by a conventional sealing flange.

After a period of one or a few operating seasons, active material, for example in the form of solid corrosion products, accumulates in these lead-throughs sealed by sealing flanges in such a quantity that a noticeable radiation level can be detected from them. This results in drawbacks, especially since the mentioned lead-throughs are usually arranged at the bottom of the reactor vessel close to, inter alia drive devices, on which maintenance is continuously being performed, so personnel are regularly present in the area around the lead-throughs sealed by sealing flanges.

Cleaning of a lead-through sealed by a sealing flange is admittedly possible, but must then be carried out by means of complex and difficult methods which, in addition, must be carried out from inside the reactor vessel. The object of the invention is to suggest a device intended to seal the lead-through which enables the lead-through, by means of a simple method, to be opened, washed clean and closed again.

SUMMARY OF THE INVENTION

With a device applied to close and seal a lead-through in a reactor vessel and designed according to the invention, the lead-through can, when necessary, be opened, cleaned, and closed again.

A seal for a tubular lead-through designed according to the invention comprises at least

- a cone comprising a head, a rod-shaped part and a sealing surface arranged between the head and the rod-shaped part, wherein the cone is arranged with the head inserted into the lead-through,
- an annular flange attached to the lead-through and around the rod-shaped cone inserted into the lead-through for retaining the head of the cone in the lead-through, whereby the annular flange comprises a sealing surface, corresponding to the sealing surface of the cone, in the form of a seam with which the sealing surface arranged on the cone is adapted to make contact to close and seal the lead-through,
- means for fixing and retaining the sealing surface, provided on the cone, to the seat-shaped sealing surface of the annular flange, in the form of a sealing washer and a so-called detector nut comprising a teflon seal and an intermediate drainage, wherein the rod-shaped part of the cone, in the end opposite to the head, comprises a member for connecting the cone to a flush pipe arranged in the form of an extension of the rod-shaped part of the cone.

The first end of the above-mentioned flush pipe, which end is fixed to the cone by means of a connection member arranged on the cone, is provided with a number of holes and the second end of the flush pipe is provided with means for connection of flushing water and means for attaching and operating the flush pipe and the cone connected to the flush pipe. In its second end, the flush pipe is preferably arranged with a reduced diameter.

The above-mentioned annular flange is provided in its free end with means for connecting a flush bottle arranged around the cone and the flush pipe. In its first end the flush bottle comprises means for connection to the annular flange corresponding to the connection member arranged on the annular flange, and in its second end it is provided with an internal sliding seal for sealing against the flush pipe and with a drainage connection.

Before flushing clean a lead-through which is arranged with a seal according to the invention, the following steps are taken:

- the flush pipe is connected to the cone,
- the flush pipe is attached and a force is applied which retains the cone in closed position with the sealing surface of the cone sealingly making contact with the seat-shaped sealing surface of the annular flange,
- the means comprising a neutron detector nut and a sealing washer, applied for fixing and retaining the cone, are detached and removed,
- temporarily during the installation of the flush bottle, when the attachment of the flush pipe has to be released, a nut divided into two parts is preferably mounted for fixing the cone,
- the attachment is detached such that the flush bottle can be moved up over the flush pipe,
- the flush pipe is again attached before the flush bottle is moved up and is connected to the annular flange,
- the drainage connection of the flush bottle is connected,
- the attachment is again detached and replaced by a member for operation of the flush pipe and the cone, and
- flushing water is connected to the flush pipe.

While cleaning the detector housing, the flush pipe and the cone are operated by means of the connected operating member which is capable of moving the flush pipe up and down in the lead-through and to rotate the flush pipe.

In connection with the cone being lifted by the operating member and leaving the sealing surface of the seat, the supply of flushing water through the flush pipe is opened after the flush holes of the flush pipe have been maneuvered into the lead-through. The flushing proceeds while operating the flush pipe until it can be determined by activity measurement that the lead-through has been cleaned from contaminated material. The cleaning can be made even more efficient by supplementing the equipment by means for mechanical cleaning by brushing, for example by means of a cleaning brush arranged between the flush pipe and the cone.

After completed cleaning, the supply of flushing water is closed while at the same time the sealing surface of the cone is again fixed to the sealing surface of the seat and closes the seal. After that, the flush bottle and the flush pipe are removed while carrying out the above-mentioned operations in reverse order, the cone again being fixed in the seat and retained by means of a sealing washer and a neutron detector nut.

BRIEF DESCRIPTION OF THE DRAWING

The invention will be explained in greater detail in the following with reference to the accompanying figures, wherein.

DESCRIPTION OF THE PREFERRED EMBODIMENT

Figure 1:
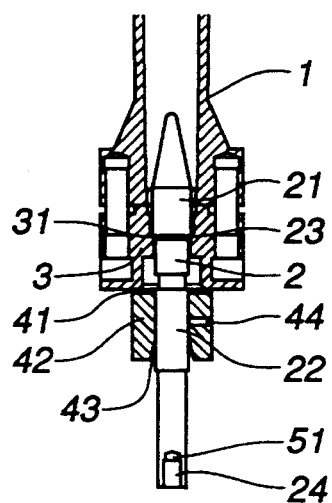
FIG. 1 shows a lead-through in the form of a neutron detector housing with a seal according to the invention.
Figure 2:
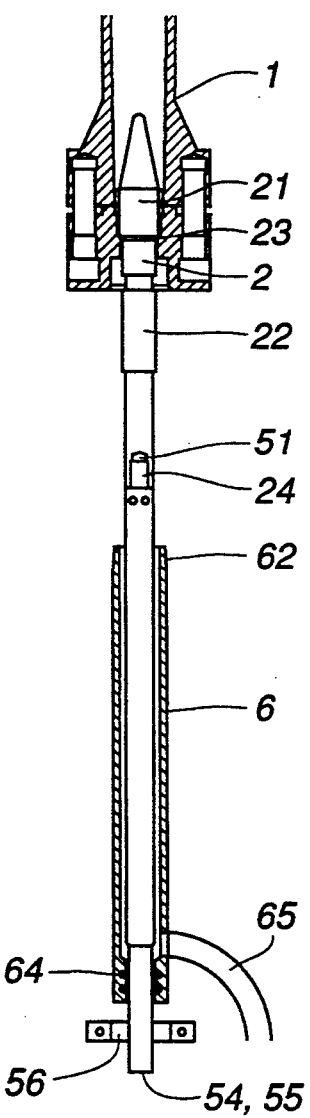
FIG. 2 shows the same detector housing and seal with a detached cone attachment, with an attached cone and a flush bottle fitted around a flush pipe, and finally
Figure 3:
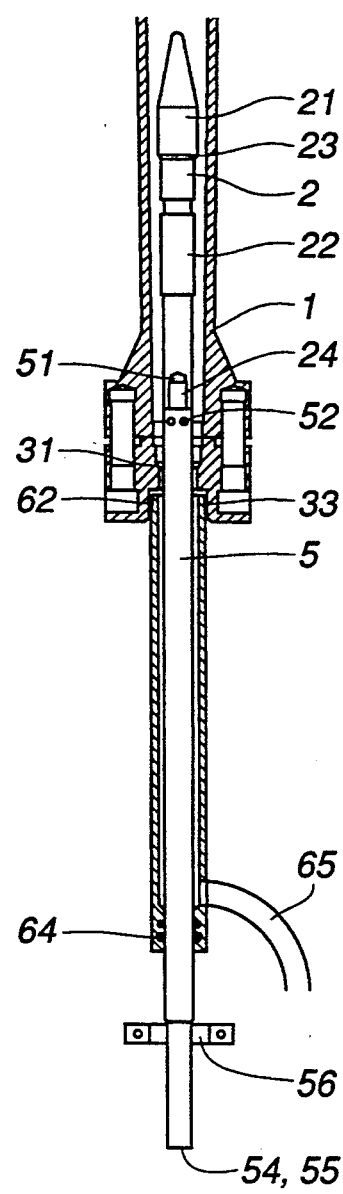
FIG. 3 shows a detector housing with a seal according to the invention wherein the neutron detector housing is being washed clean.

A tubular lead-through in the form of a neutron detector housing arranged in the bottom of a reactor vessel in a nuclear power plant and with a seal designed according to the invention is shown in FIG. 1.

A neutron detector housing 1 is, according to the invention, adapted to be closed and sealed off by means of a device comprising a cone 2 comprising a head 21 a rod-shaped part 22 and a sealing surface 23 arranged between the head 21 and the rod-shaped part 22, wherein the cone 2 is arranged with the head 21 inserted into the neutron detector housing 1, an annular flange 3 attached to the lead-through 1 and around the rod-shaped cone 2, inserted into the lead-through 1, for retaining the head 21 of the cone in the lead-through 1, whereby the annular flange 3 comprises a sealing surface 31, corresponding to the sealing surface 23 of the cone, in the form of a seat 31 with which the sealing surface 23 arranged on the cone is adapted to make contact to close and seal the lead-through 1, means for fixing and retaining the sealing surface 23, provided on the cone, to the seat-shaped sealing surface 31 in the form of a sealing washer 41 and a so-called neutron detector nut 42 comprising a teflon seal 43 and an intermediate drainage 44, wherein the rod-shaped part 22 of the cone 2, in the end opposite to the head 21, comprises a member 24 for connecting the cone 2 to a flush pipe 5 arranged in the form of an extension of the rod-shaped part of the cone.

The first end of the above-mentioned flush pipe 5, which end is fixed to the cone 2 by means of a connection member 24 arranged on the cone 2 and an attachment 51 arranged on the flush pipe, is provided with a plurality of holes 52, and the second end of the flush pipe is provided with means 54 for connection of flushing water and means 55 for connecting an attachment (not shown) by means of which a retaining force is applied to the flush pipe 5 and the cone 2 connected to the flush pipe. As shown in the figures, both the flushing water and the attachment can be connected by means of the same pin 54, 55 projecting from the flush pipe 5. During cleaning, the cone 2 and the connected flush pipe 5 are operated by means of an operating member 56. The second end of the flush pipe 5 is preferably made with a reduced diameter.

In its free end, the above-mentioned annular flange 3 is provided with means 33 for connecting a flush bottle 6 arranged around the cone 2 and the flush pipe 5. In its first end the flush bottle 6 comprises means 62 for connection to the annular flange 3 and corresponding connection means 33 arranged on the annular flange 3. In the second end of the flush bottle, an internal sliding seal 64 is arranged for sealing against the flush pipe 5 and a drainage connection 65 is arranged for drainage of contaminated water.

Before cleaning a neutron detector housing 1, which when no neutron detector is mounted is arranged with a seal according to the invention, the following steps are taken:

the flush pipe 5 is connected to the cone 2, the flush pipe 5 is attached and a force is applied by means of the attachment member 55, whereby the cone 2 is retained in closed position with the sealing surface 23 of the cone sealingly making contact with the seat-shaped sealing surface 31, the means comprising a neumron detector nut 42 and a sealing washer 41, applied for fixing and retaining the cone, are detached and removed, the teflon seal 43 being already removed, temporarily during the mounting of the flush bottle 6, when the attachment 55 of the flush pipe has to be released, a nut divided into two parts is preferably mounted for fixing the cone 2, the attachment is detached such that the flush bottle 6 can be moved up over the flush pipe 5, the attachment 55 is again applied to the flush pipe 5 before the flush bottle 6 is moved up and is connected to the annular flange 3, the drainage connection 65 of the flush bottle 6 is connected, the attachment 55 is again detached and a member 56 for operation of the flush pipe 5 and the cone 2 is connected to the flush pipe 5; and flushing water is connected to the flushing water connection of the flush pipe 5.

While cleaning the detector housing 1, the flush pipe 5 and the cone 2 are operated by means of the connected operating member 56 which is capable of moving the flush pipe 5 up and down in the lead-through 1 and to rotate the flush pipe 5.

In connection with the cone 2 being lifted by the operating member 56 and leaving the seat-shaped sealing surface 31, the supply of flushing water through the flush pipe 5 is opened immediately after the flush holes 52 have been maneuvered into the lead-through 1. The flushing proceeds while operating the flush pipe 5 with the cone 2 until it can be determined by activity measurement that the lead-through 1 has been cleaned from contaminated material. The cleaning can be made even more efficient by supplementing the equipment by means for mechanical cleaning by brushing, for example by means of a cleaning brush arranged between the flush pipe 5 and the cone 2.

After completed cleaning, the supply of flushing water is closed while at the same time the sealing surface 23 arranged on the cone is again fixed to the seat-shaped sealing surface 31 and closes the seal 1. After that, the flush bottle 6 and the flush pipe 5 are removed while carrying out the above-mentioned operations in reverse order, the cone 2 again being fixed in the seat and retained by means of a sealing washer 41 and a neutron detector nut 42.

I claim:

1. An apparatus for closing and sealing a lead-through and which is capable of cleaning the lead-through of solid material deposited therein, said apparatus comprising an annular flange which is attachable to the lead-through, said annular flange defining an internal seating surface, a cone which comprises a head, a rod-shaped part and means forming a sealing surface means located between said head and said rod-shaped part, said rod-shaped part defining an end opposite said sealing surface means which includes a connection means for a flush pipe, said cone being positionable within and movable relative to said annular flange such that, when said annular flange is attached to a lead through, said sealing surface means of said cone abuts said seating surface of said annular flange to close and seal said lead-through, or such that said sealing surface means is spaced from said seating surface and said cone is positioned out of said annular flange and within said lead-through, and a flush pipe defining a first end which is attachable to said connection means and which includes a plurality of holes for emitting flushing water, and a second end which includes means for connecting to a source of flushing water and means for connecting to an operating means, said flush pipe, when connected to said connection means of said rod-shaped part, being capable of moving said cone relative to said annular flange, such that said holes of said flush pipe are positioned within said lead-through.

2. An apparatus according to claim 1, including a detector nut positioned around said rod-shaped part of said cone and a sealing washer positioned between said detector nut and said annular flange to fix said sealing surface means of said cone against said seating surface of said annular flange, said detector nut including a teflon seal positioned against said rod-shaped part and defining drainage openings.

3. An apparatus according to claim 1, including a flush bottle positioned around said flush pipe and movable toward and against said annular flange for drainage of flush water, said annular flange defining a connecting means for connection thereto of said flush bottle.

* * * * *